United States Patent
Morales Barroso (10) Patent No.: US 7,710,936 B2
(45) Date of Patent: May 4, 2010

(54) UNIVERSAL ETHERNET TELECOMMUNICATIONS SERVICE

(75) Inventor: Jose Morales Barroso, Adva. Europa, 30, Portal 3 - Ducha. Bajo B, Madrid (ES) E-28224

(73) Assignees: Jose Morales Barroso, Madrid (ES); L&M Data Communications, S.A., Madrid (ES)

( * ) Notice: Subject to any disclaimer, the term of this patent is extended or adjusted under 35 U.S.C. 154(b) by 494 days.

(21) Appl. No.: 11/628,272

(22) PCT Filed: May 13, 2005

(86) PCT No.: PCT/ES2005/000267

§ 371 (c)(1),
(2), (4) Date: Dec. 4, 2006

(87) PCT Pub. No.: WO2005/122491

PCT Pub. Date: Dec. 22, 2005

(65) Prior Publication Data

US 2007/0291716 A1    Dec. 20, 2007

(30) Foreign Application Priority Data

Jun. 2, 2004    (ES)    ................. 200401335

(51) Int. Cl.
*H04W 4/00*    (2009.01)
(52) U.S. Cl. ...................................... 370/338; 370/328
(58) Field of Classification Search ................. 900/910, 900/902; 370/338, 328
See application file for complete search history.

(56) References Cited

U.S. PATENT DOCUMENTS

| 6,188,689 B1 * | 2/2001 | Katsube et al. ............. 370/389 |
| 6,559,882 B1 * | 5/2003 | Kerchner ..................... 348/61 |
| 6,751,229 B1 * | 6/2004 | Waller et al. ................ 370/419 |
| 2003/0037170 A1 * | 2/2003 | Zeller et al. ................. 709/253 |

(Continued)

FOREIGN PATENT DOCUMENTS

EP    1475942 A2    11/2004

OTHER PUBLICATIONS

Cisco Systems: "Metro Ethernet WAN Services and Architecture" White Papers, Dec. 2002., p. 12-23; Fig. 8, 11, table 8.*

(Continued)

*Primary Examiner*—Lun-Yi Lao
*Assistant Examiner*—Opiribo Georgewill
(74) *Attorney, Agent, or Firm*—Browdy and Neimark, PLLC (57) ABSTRACT

We describe a universal Ethernet telecommunications service (UETS) that combines the features of the telephone network, local area networks and the Internet in order to offer integrated broadband services by re-using the infrastructure of the telephone and electrical networks. User-network communication extends the Ethernet local network services to the infrastructure of the operator in the "Ethernet domain", which is distinguished from the Internet "IP domain". The access device offers packet telephone service, with power supply over the telephone pairs, which guarantees the emergency call through the exchange being provided with a battery and power control for energy saving. Terminals are also defined with a simple supervisor to support the applications used in the Internet, which communicate via the Ethernet domain with the LLC/MAC or TCP/IP protocols and via the IP domain with the TCP/IP protocols.

4 Claims, 9 Drawing Sheets

U.S. PATENT DOCUMENTS

2004/0202199 A1* 10/2004 Fischer et al. ............... 370/474
2004/0268160 A1* 12/2004 Atkinson et al. ............ 713/300

OTHER PUBLICATIONS

Cisco Systems: "Metro Ethernet WAN Services and Architecture", White Papers, Dec. 2002, pp. 12-23.*

Prashant Gandhi and Bob Klessig, Metro Ethernet WAN Services and Architectures, International Engineering Consortium's Annual Review of Communications, Jun. 2003.

Computer Networks to the Computer on Net, IEEE Communications Magazine / Global Communications Newsletter, Oct. 2005, pp. 2-4.

UETS/EFR: The Next-Generation Ethernet-only Network, The New Layer-2 Architecture and Physical Switching Paradigms. Manuscript, IEEE Communications Magazine. Submitted Nov. 9, 2005.

WWN "World Wide Net", UETS/EFR : Universal Ethernet Telecommunications Service / Ethernet Fabric Routing ISBN: 978-84-89416-46-8—Legal Deposit: M-18835-2007.

* cited by examiner

UNIVERSAL ETHERNET TELECOMMUNICATIONS SERVICE

OBJECT OF THE INVENTION

The present invention refers to a Universal Ethernet Telecommunications Service, which provides the essential features of novelty and notable advantages in respect of the known means used for the same purpose in the present state of the art.

More particularly, the invention proposes the development of a telecommunications service of a universal nature combining features of the telephone network, local area networks and the Internet in order to offer integrated broadband services re-using the infrastructure of the telephone and electrical networks, extending the Ethernet local network services to the operator's infrastructure.

The field of application of the invention lies in the framework of the information technologies and communications and more particularly relates to the voice telephone network, local area networks, packet telephony, broadband services, and data transmission over the electrical network and the Internet.

BACKGROUND AND SUMMARY OF THE INVENTION

Ever since 1970 the search has been going on for a solution to what the International Telecommunications Union called the Integrated Services Digital Network or "ISDN", a new system, a development of the analogue or digital public switched telephone network to a single common network infrastructure in order to offer voice, data and multimedia services by way of a single interface. The work carried out by the International Consultative Committee for Telephony and Telegraphy (CCITT) gave rise to a set of Recommendations for the ISDN system, but they did not finally achieve the desired result, as the resultant network used low speed circuit technology (64000 bits per second), which was not suitable for data traffic. Subsequently, numerous attempts have been made in this respect, such as ATM, or the more recent ones based on the use of ADSL techniques, without the objective of total service integration being achieved so far.

Recently, new proposals have appeared for the integrated network, with different orientations. Some propose maintaining the classic infrastructure of digital telephone circuits, adding XDSL type accesses, fundamentally with the ADSL alternative, providing access to the Internet and IP services on an ATM switch infrastructure. This may not really be considered as an integrated network as, although all the communications are digital, the telephony goes on using the circuits technique, while the data are carried on packet networks, there actually being three network technologies: pure circuits for the telephone, virtual circuits for ATM and datagrams for IP. Another very serious problem of ATM technology is that it is based on virtual circuits (connected mode), while IP and Ethernet are based on datagrams (non-connected mode). A universal service like that proposed in this invention would not be possible with ATM, as has already been adequately shown with all the attempts that have been made since 1993 to offer local network services with ATM, being particularly illustrative what happened with LANE (LAN Emulation).

Furthermore, systems are appearing that offer access to the telecommunications network based on Ethernet technology—IEEE 802.3, but only as a connectivity service between different points of connection to the network. The typification of the Metro Ethernet Forum is illustrative of these.

The IEEE 802.3 Ethernet Standardisation Committee has set up the IEEE 802.3ah (Media Access Control Parameters, Physical Layers and Management Parameters for subscriber access networks) working group for access to telecommunications networks based on Ethernet. This standard is of use as a base for the development of the invention being described here, as it provides the basic specifications for setting up connections with a telecommunications network over the telephone pair, a key element for taking advantage of the existing infrastructure. With 1200 million telephone lines in the world, according to a recent estimation published by Lucent Technologies, there is an enormous potential for an integrated services solution capable of using the traditional telephone access loop infrastructure.

This invention corresponds to a universal telecommunications service based on Ethernet technology, according to the specifications of the IEEE 802.3 and ISO/IEC 8802-3 standards to which there will be applied the acronym "UETS" (Universal Ethernet Telecommunications Service), which refers to the equipment and services needed for the evolution, development and implementation of a universal network of services integrated on a single interface based on the packet technique in non-connected mode, using as the logic means data exchange the formats defined in standards IEEE Std 802.3 and IEEE Std 802.2 [ISO/IEC 8802-2] and as the physical means the access infrastructure over copper pairs of the analogue or digital telephone network, the electrical network with PLC (Power Line Communications) techniques, optical fibers and wireless systems.

Standard IEEE Std 802-2001 defines the term "local area network" or LAN as a "computer network, located on a user's premises, within a limited geographical area". It also defines "802 LAN" as "a LAN consisting of an access domain using either a MAC protocol specified in one of the IEEE 802.n and ISO/IEC 8802-n Standards". This is applicable to IEEE 802.3 and ISO/IEC 8802-3, from where this invention takes the "Ethernet domain" concept.

The object of the invention is a new universal digital telecommunications service, where a clear distinction is made between the "Ethernet domain", in which the service is offered, and the "IP domain", which offers connectivity via the Internet, with the possibility of either versions 4 and 6 of the IP Internet protocol being used. One of its advantages is that it allows existing telephone pairs to be used for connecting the special Ethernet network termination devices, described in this invention, with the network resources situated in the services supplier's part. For the connection data pairs, optical fibers, wireless systems or the ones based on the electrical network like PLC (Power Line Communications) may be used, when the service or broadband needs advise it.

This invention takes advantage of the experience gained by the more mature technologies: the classic physical circuit telephone network, the virtual circuit networks (X.25, Frame Relay and ATM), the Ethernet-based local area networks, and the Internet, now used all over the world. By choosing the best of all these and combining it in an absolutely novel way, an end solution has been reached that is extraordinarily simple in its approach, efficient in its working, austere in the use of resources, environmentally friendly due to consuming the strictly necessary energy by means of the power control mechanism, and of assured operation through using well proven techniques and those in which the inventor has long practical experience. The network proposed is capable of offering all the advanced telecommunications services: voice, telephony, data, videoconference, image, real-time video, on-demand video, remote control, remote metering, network storage services, access to applications servers, transactional services, network games, tele-education, tele-medicine, e-business, etc.

Ethernet-based local area networks are used today all over the world and form an unparalleled data system, hitherto confined to building and campus installations. Their advantages are evident and their wide-scale use has brought about a reduction in the costs of the network equipment, now very largely composed of switches to which the terminals are connected at speeds of 10, 100 and 1000 megabits per second. A key idea of this invention is the extension of the Ethernet local network to the telecommunications installations of the operator, who in this way is able to offer services equivalent to those currently offered in local building or campus networks, being systems of proven efficacy and of which there is a great deal of experience, so that it is possible to offer advanced high-speed services at a minimal cost per bit transmitted.

In order to be able to transport voice, data and video at the same time over Ethernet links, at least 2 megabits per second in balanced duplex mode is required, i.e. at the same speed in both transmission directions. Thus, the requirements of the International Telecommunications Union are also met, as in Recommendation I.113 of the ITU Standardisation Sector broadband is defined as a "faster transmission capacity than the primary speed of the Integrated Services Digital Network (ISDN) at 2.0 megabits per second", which represents a net speed of 1.92 megabits per second, as the ISDN primaries transport 30 channels at 64000 bits per second each. Although a minimum service is assured with that speed, it is desirable to raise it to 10 or 100 megabits per second whenever possible.

Furthermore, in order to be considered a genuine Telecommunications Service, the connection must meet certain particular conditions, taken from the classic telephone network, such as the terminal power supply via the pairs so as to guarantee the emergency call service (112 in Europe or 911 in the United States), and the terminal power control so as not to consume energy from the exchange other than when essential (the current Ethernet network devices consume energy all the time). Supposing that this were used for access to broadband networks and applying the most conservative forecasts of 200 million users in 2010, the minimum energy saving would be in the region of 14 TWh a year, equivalent to some 1400 million euros a year at the current price of electric energy.

The 2BASE-TL and 10PASS-TS modalities of the new IEEE 802.3ah standard make it possible to access the telecommunications network at 2 and 10 megabits per second over a single telephone pair, including the procedures necessary for the link operation and maintenance (OAM). To have the functions required by this invention available, it is necessary to add the functionalities that are not in the afore-mentioned IEEE 802.3ah standard: power supply over the telephone pair, power control and management for energy saving and increasing the speed up to 100 megabits per second. Power supply over the pair does not represent a problem, as this is done at the ISDN connections and when the ADSL router co-exists in the same telephone pair with the DC-powered telephone. The power control is included in the IEEE 802.11 systems, as described in point 11.2 of the standard (Power Management), it being possible to adapt this system to transmission over pairs or to use other techniques, such as those defined for ISDN systems. Chips already exist for operation at 100 megabits per second over telephone pairs, such as those made by Fujitsu Access Ltd.

The power source in the access equipment, located on the user's premises, would mean that, in the event of a power failure, the connection would be lost, which is not acceptable in a true Telecommunications Service, in which it is necessary to maintain emergency communications. In addition, power supply from the exchange is more efficient from the energy point of view than local supply, more reliable through being able to incorporate a higher level of redundancy, and to assure the service batteries are incorporated in the exchange—a classic telephone network solution.

In order to offer the basic telephone service and guarantee the emergency call service, the user's end network terminator will be supplied from the exchange and will include a telephone that may use the voice on packets (VoP) techniques with SIP (Session Initiation Protocol) signalling, according to the specifications of the corresponding IETF (Internet Engineering Task Force) RFCs. As an alternative, it would also be possible (though not recommendable) to make use of Recommendation H.323 and related International Telecommunications Union ones. The access service to the telephone network can be offered and managed by the own operator, thereby permitting the telephone number to be maintained both for incoming and outgoing calls. It would also be possible to assign a specific prefix for the data terminals wishing access to and from the telephone network, such as 050 in the case of Japan, or to use ENUM type techniques.

The Internet model resolves the concepts universal network and terminal services, with the TCP and IP protocols for interconnection, and the Internet applications use a universal presentation based fundamentally on the browser model (Netscape, Internet Explorer, etc.) and on the W3C specifications. The applications, for communicating over the Internet, set up connections by the association of IP addresses and IP and TCP/UDP source and destination ports. The information travels in circuit mode with TCP or in datagrams mode with UDP on the IP datagrams. The main problem of the TCP/IP protocol stack is that they correspond to layers 3 and 4 of the reference communications architecture, and they correspond to software applications, which represents a major limitation as regards efficiency, both in the hosts and in the routers. If we take as a reference the strategy used in the virtual circuit networks, we may see that when the layer 3X.25 protocol made it impossible technically speaking to increase the speed of the network connections, a change was made to layer 2 switching with Frame Relay. In the case of the Internet, it would be fundamental to adapt the applications so that instead of the IP protocol they should directly use MAC 802.3 encapsulating, which with its 6 octets of addresses has 140,737, 488,355,328 possible different combinations (in local networks, with the ARP process, an IP address is associated with a MAC address). While the IP datagrams have to progress by routing procedures, the MAC 802.3 frames use very mature switching procedures proven in the field of local networks. When wishing to extend the Ethernet domain to remote premises, pure circuit techniques may be used with synchronous digital hierarchy (SDH) or MPLS tunnels, which transport the MAC 802.3 frames directly. At transport layer, the TCP protocol could be substituted for internal connections in the Ethernet domain by the LLC 802.2 type 2 protocol for setting up reliable circuits and the UDP protocol by the LLC 802.2 type 1 or type 3, in accordance with the needs of the applications. For this purpose, for instance, a LSAP value not used currently could be employed for indicating that the two octets corresponding to the TCP or UDP are going next, in the MAC field local address could be used, indicated with the U/L bit fixed to 1, and transport the IP addresses in the source and destination MAC addresses field. In this way, use could be made of all the current Internet applications that go on TCP, UDP and IP within the Ethernet domain.

The set of network elements that uses the MAC/IEEE 802.3 and LLC/IEEE 802.2 link layer protocols for the connections of network users and servers constitutes the "Ethernet domain", this being limited to the infrastructure of the services supplier and isolated from other environments, in particular from the Internet IP domain. The services may be offered in the Ethernet domain, in the IP domain or by a combination of both. The owner operator of the physical network infrastructure, which connects the users with the switching exchange, may use various techniques to route the traffic to multiple suppliers of services, for example by means of VLAN techniques according to the IEEE 802.1 standard or by the use of local MAC addresses identifying every one of the suppliers. With this solution, the suppliers may offer services in the Ethernet domain both with LLC/MAC and with TCP/IP transport, in the latter case taking advantage of all the current Internet environment equipment and applications.

Another important element of the invention is the intelligent terminal, in which all the common Internet applications run on a supervisor capable of being connected to the Ethernet domain by means of the protocols described above (LLC/MAC and TCP/IP) and communicating in it with the servers, which will also have the corresponding connectivity protocols. The terminals, both clients and servers, will have TCP/IP protocol stacks for connectivity with the IP domain, and LLC/MAC for connectivity in the Ethernet domain. When accessing services in the Ethernet domain, they will use the LLC/MAC connector and VLAN techniques and when accessing the IP domain, they will use the TCP/UDP/IP connector. The Ethernet and IP domains may co-exist on the same physical infrastructure, as the terminals described have the capacity to operate on either one or the other.

One of the main problems for the widespread use of broadband services is the need to connect up to them by means of a personal computer with an operating system, a solution too complex for the majority of potential users of the service, as they do not understand its operation nor are they capable of maintaining it properly. To this are added the high cost of the system and its rapid obsolescence, which means that the investment in computer equipment has a short period of life. It is unnecessary to describe the severe problems of security due to viruses and attacks of all kinds that arrive over the Internet, in the face of which the average user feels impotent and which sooner or later end up causing him problems, or the difficulties entailed in the management of the back-up copies of the information stored in the computer. All this is a task for professionals, and a complete solution is provided to this with the terminal that is proposed in this invention. First of all, through not having an operating system, the possible attacks from the network are minimised through being connected to the Ethernet domain controlled by the service supplier, which represents a protected area. As the local network is extended to the service supplier, he will be the one to install and maintain the different servers: applications, data, e-mail, names and addresses, audio, video, etc. With this system, we resolve the problem of software licenses, as the user pays for the service and the supplier takes care of paying for the respective licenses. Something similar happens in the case of audio and video, as the users will pay for the number of accesses to the contents. With these new services, the telecommunications operators may offset the loss of revenue they have been experiencing because of the telephone bill, due in a large extent to the expansion in the use of voice on packets.

If the end user so wishes, he will be able to have servers at his installation, the traffic of these being restricted to his segment of network, through being connected to the services supplier with a device that filters the traffic to the access network. This would be applicable from a small domestic network right up to a super-computer with thousands of parallel processors.

Through having to initiate only a small-sized program, the starting of the terminal is practically immediate. In case of problems, you only have to switch off and on, as the browser program and the file handler are in a non-volatile memory. For the extreme case of an irreparable failure occurring in these programs, the terminal will be endowed with the mechanisms needed to carry out an initial loading from the applications servers of the services supplier, who will also be the one responsible for installing the corresponding updates. A solution could be that every time the terminal is started, a connection is set up with the applications server, which will send it the necessary updates or the complete program if so requested by the user.

SHORT DESCRIPTION OF THE DRAWINGS

These and other features and advantages of the invention will be made clearer by means of the following detailed description of a preferred form of embodiment, given solely for informative and non-restrictive purposes, with reference to the accompanying drawings in which.

DESCRIPTION OF A FORM OF PREFERRED EMBODIMENT

Figure 1:
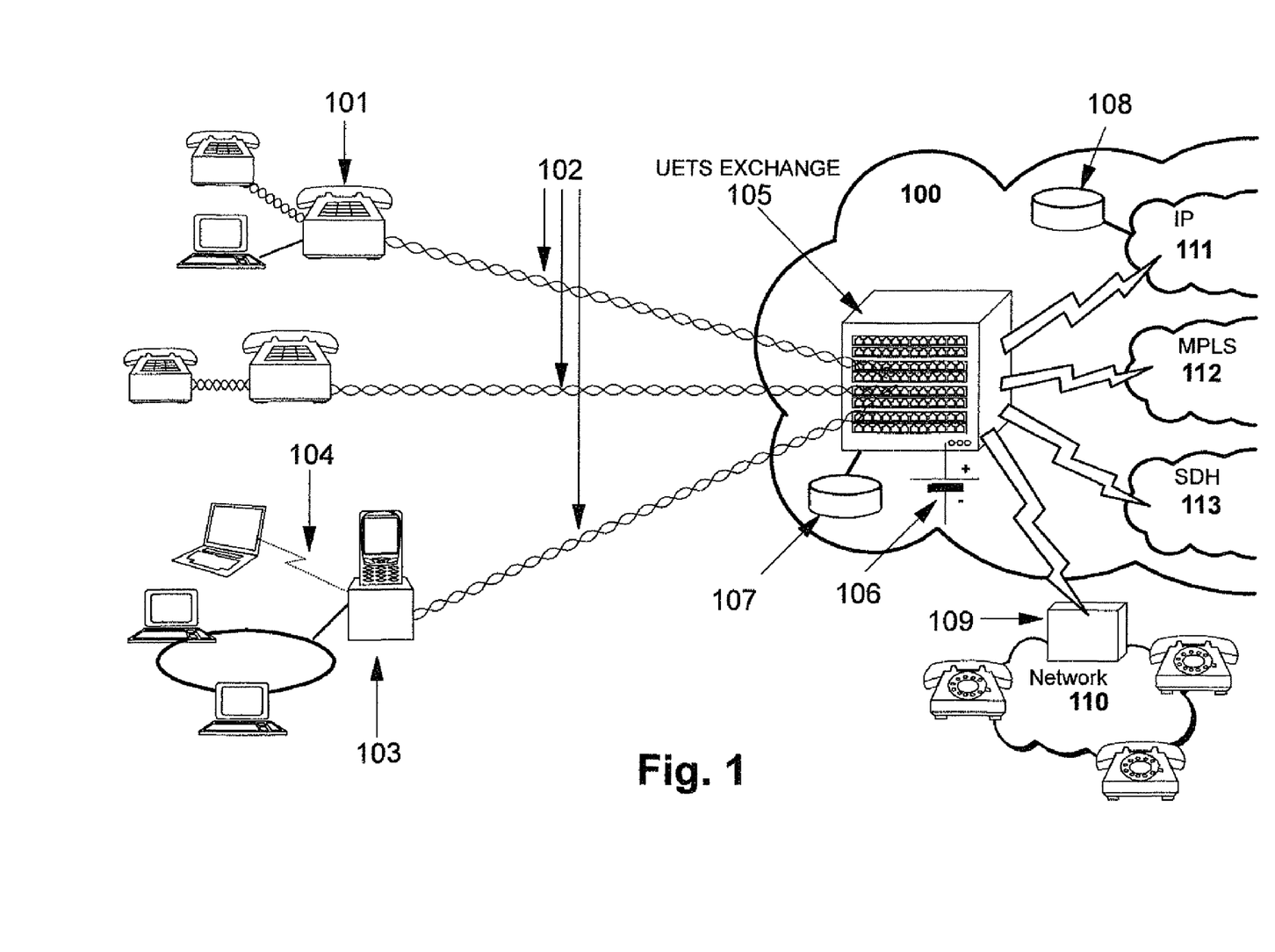
FIG. 1 shows diagrammatically the basic architecture of the main elements of the service proposed by the invention, known as the Universal Ethernet Telecommunications Service.

As stated above, the detailed description of the invention is going to be carried out taking into consideration the representations of the adjoining drawings, by way of which numerical references are used to designate the parts of the invention. In this respect, FIG. 1 shows the basic architecture of the main elements of the service or elements of the universal telecommunications service (100). The network is accessed by means of the Terminator of Universal Ethernet Network (TRUE) (101), which is connected by means of the subscriber loop telephone pairs (102), from which the power supply is received from the UETS exchange (105), the cables of the electrical network, optical fibers or wireless links. This device offers a telephone service by means of the packets technique with its own internal server or by means of the supplier's servers connected to the Ethernet domain (107) or to the IP domain (108).

Besides the basic telephone service described, users may connect terminals of various types directly to the TRUE (101, 103), or by means of the local network (104).

The UETS exchange (105) connects service users, who, in addition to accesses by telephone pairs, will be able to use data pairs, optical fibers or wireless, when necessary, thereby forming the "Ethernet domain" by means of exchanges of this type interconnected to one another with the topology that may be most appropriate for each case. The exchange will supply the terminals connected by means of copper cables and will take part in power control for energy saving in all types of connections, including copper, optical fiber and wireless ones. To guarantee the service, it will be provided with a battery (106).

The exchange may include the interfaces necessary for connectivity with IP (111), MPLS (112) and SDH (113) networks, as well as the hardware and software needed (109) so that the telephones that operate on packets in the Ethernet domain may make and receive calls from the telephone network (110).

Figure 2:
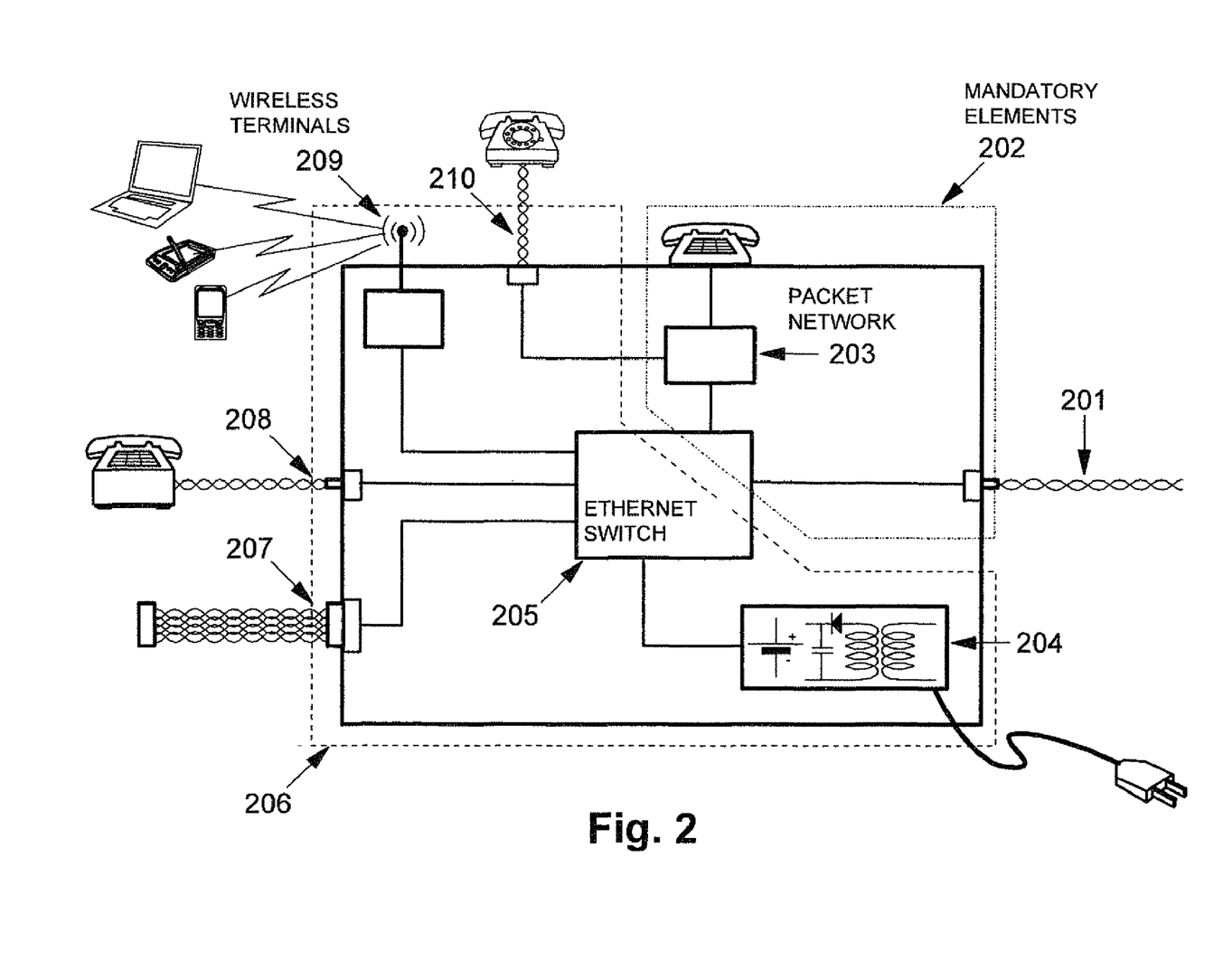
FIG. 2 illustrates by means of blocks of drawings of a diagrammatic nature the Terminator of Universal Ethernet Network (TRUE), being one of the main elements in the Universal Ethernet Telecommunications Service provided with the connections to other elements of the service and to the electrical network.

This device is connected to the UETS exchange by means of a telephone pair (201), and alternatively by means of the electrical network cables, optical fibers or wireless systems, in any of the cases at a speed of 2 megabits per second or more in balanced duplex mode.

It is composed of a set of mandatory elements, defined by a discontinuous dash and dotted line (202) and other optional elements, defined by a discontinuous dash line (206).

The mandatory elements (202) offer exclusively the telephony service, these being the interface for connection to the exchange over the telephone pair (201), the electronics necessary for the telephone on packet network (203) to which the dialing device, the earphone and the microphone which make up the telephone are connected. All these mandatory elements will be supplied from the exchange, which guarantees the emergency call service in case of a local power failure.

The optional elements may use the power supply from the exchange or a source of their own with a local battery (204) depending on their consumption. The interconnection element is an Ethernet switch (205), which will permit the connection to the service of devices of type 802.3 with 802.3af over 4-pair data cables or optical fibers (207), of other TRUE devices over the telephone pair (208), of wireless terminals (209) or PLC via the power source, and of the electrical network cables (204). It may also optionally have connections to analogue telephones (210).

Figure 3:
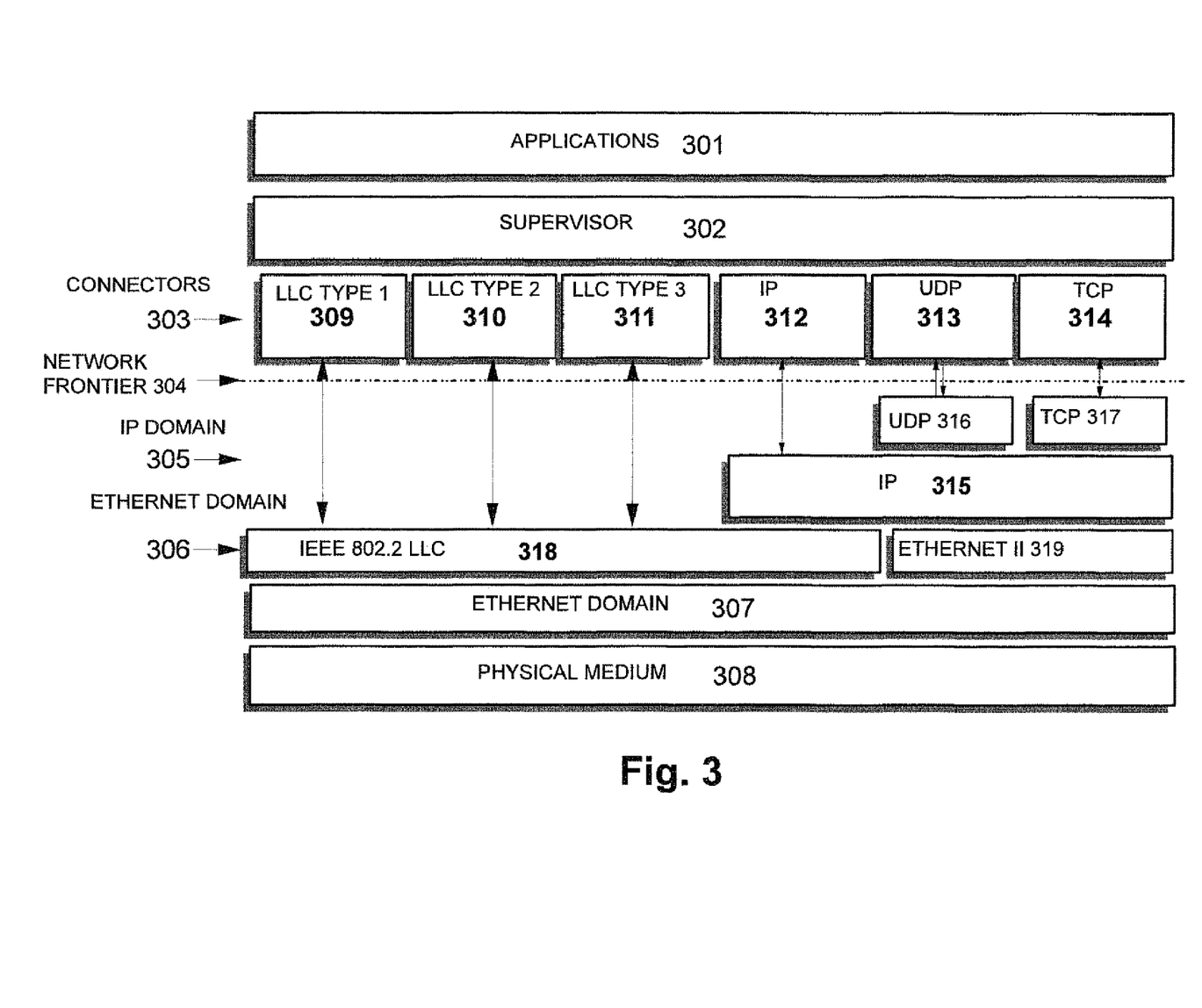
FIG. 3 represents with a block diagram the part that corresponds to communications, determining the communications architecture of the universal-terminal.

FIG. 3 describes only the part corresponding to communications. This may be implemented in any computerised system, from the controller of a vehicle or a household appliance to a high-performance processor of a super-computer system, with no other limitation than the capability to be connected to the network. The applications (301) run in the terminal over a supervisor (302) capable of communicating with the remote systems by means of connectors (303) capable of operating solely in the Ethernet domain, on LLC type 1 (309) 2 (310) and 3 (311), or in the IP and Ethernet domains on IP (312), UDP (313) and TCP (314). The network frontier (304) corresponds to the service access points, which will be offered in the IP domain (305) with the IP (315), UDP (316) or TCP (317) protocols in the Ethernet domain (307). The IP domain services in the UETS will be provided exclusively on the Ethernet domain (307), irrespective of whether the IP protocol corresponds to versions 4 or 6. The IP communications may use IEEE 802.2 LLC (318) or Ethernet II (319) encapsulations. For the communication of the terminals in the Ethernet domain (306), local MAC addresses and IEEE 802.2 LLC encapsulating will preferably be used.

When necessary or considered advisable, the terminals will also be communicated in the Ethernet domain with the TCP/IP stack.

The physical medium (308) may be of any type that supports 802.3 frames exchange: "backplanes" or system buses, voice or data grade copper cables, monomode or multimode optical fibers, wireless systems and electrical network cables.

Figure 4:
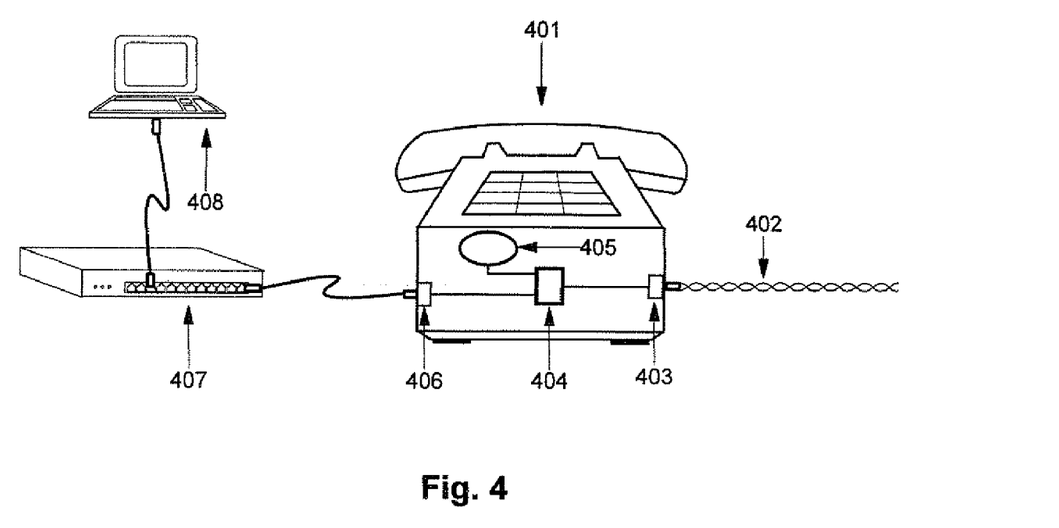
FIG. 4 illustrates in detail by means of blocks of drawings of a diagrammatic nature an Terminator of Universal Ethernet Network (TRUE) connected as a basic application to other units or elements involved in the communication, Like the previous figure.

In the basic configuration, shown in FIG. 4, voice and data services are offered with a universal Ethernet network terminator (401), which comprises the keyboard, earphone and microphone of the telephone, with the electronics for operating on the packet network (405), connected to the Ethernet switch (404) together with the data interface (406) and the network access interface (403), which receives the power supply over the telephone pair (402). The different types of terminals (408) will in turn be connected directly or by means of a switch (407) to the data interface (406). The telephone pair interfaces will use RJ-11 connector, the data pair cables RJ-45 connector, and the connection to the electrical network will be done by way of the respective jack according to local regulations.

Figure 5:
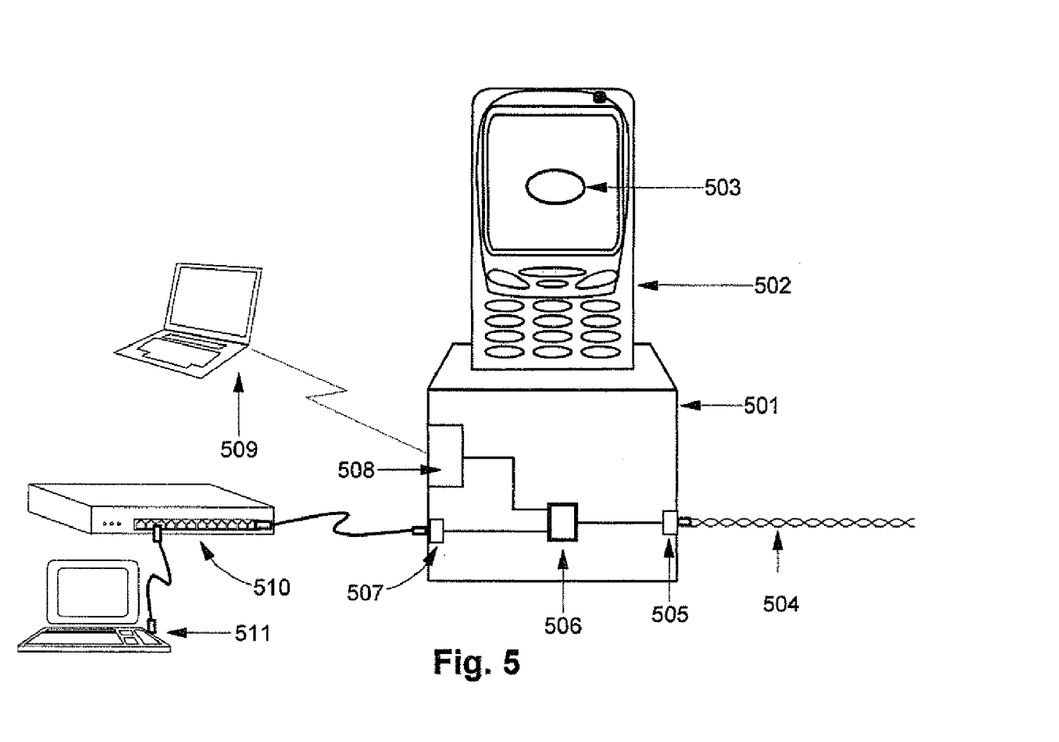
FIG. 5 shows a Terminator of Universal Ethernet Network (TRUE), but wireless, with a basic type connection to other units.

Basic wireless Terminator of Universal Ethernet Network (TRUE), according to FIG. 5, which is made up of a fixed base (501) connected to the exchange over the telephone pair (504) by means of the respective interface (505) with RJ-11 connector and also comprises an Ethernet switch (506), a cable data interface terminal access (511) either direct or via switch (510) and a Wi-Fi wireless access point (508) which permits the connection of the wireless telephone (502), which includes the electronics needed for communication on packets (503), as well as for any other Wi-Fi terminals (509). The fixed base (501) receives the power supply over the telephone pair (504) from the exchange and in turn it charges the battery of the wireless telephone (502), while it may also be connected via the electrical network.

Figure 6:
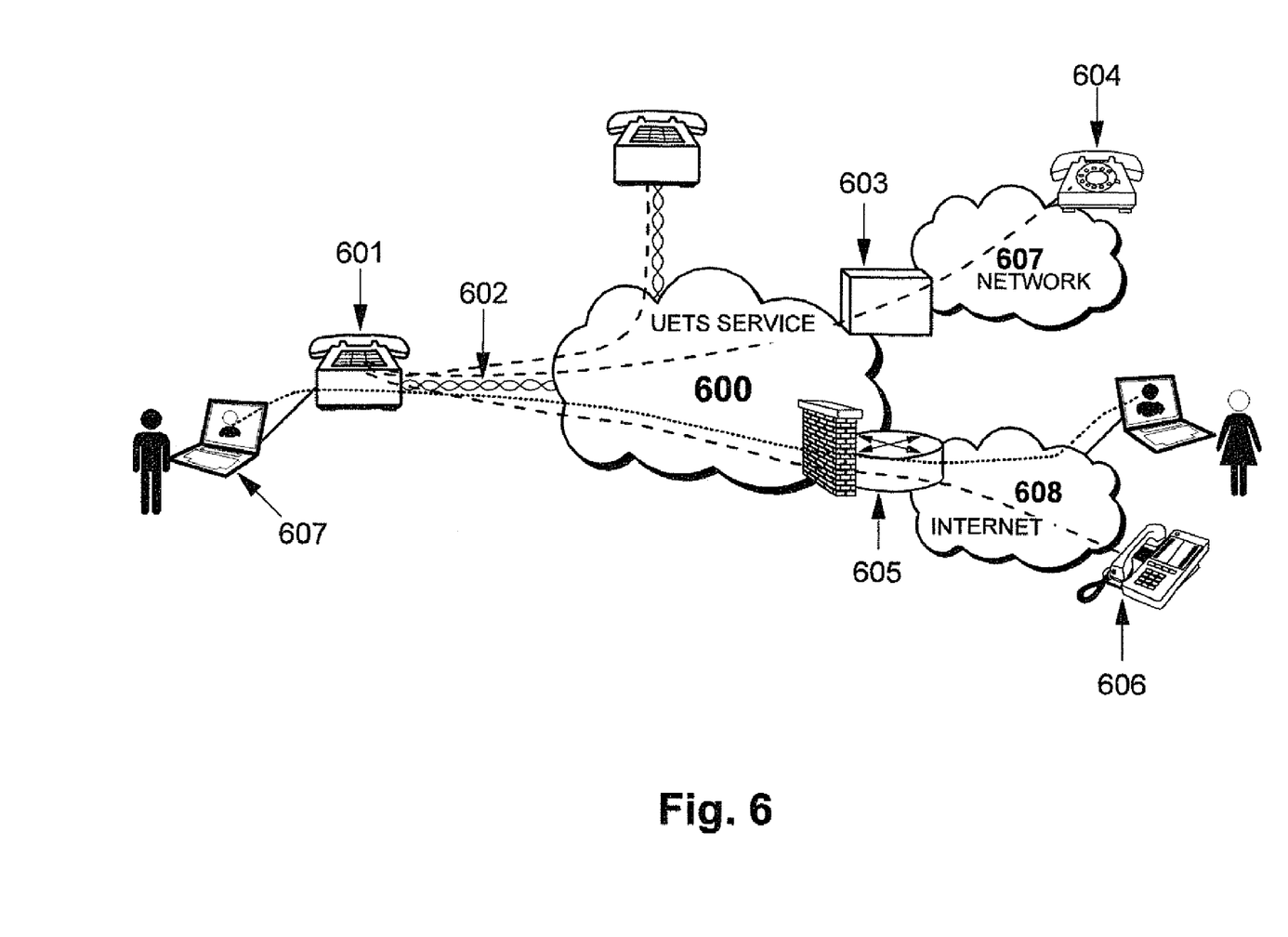
FIG. 6 represents diagrammatically with drawings a complete network of basic telephony, audio and videoconference services.

In this example, represented in FIG. 6 showing an alternative for basic telephony, audio and videoconference services, the TRUE (601) is connected via the telephone pair (602), from which it receives the power supply that assures the emergency call service, to the UETS service (600). From the telephone incorporated in the TRUE a communication may be set up with and from any other TRUE in the Ethernet domain, with and from any telephone (604) connected to the telephone network (607) via the gateway (603), and with and from any IP telephone (606) via the router with firewall (605) that connects the Ethernet domain with the Internet (608). In the same way, audio and videoconference connections may be set up by using the appropriate terminals for this purpose (607).

Figure 7:
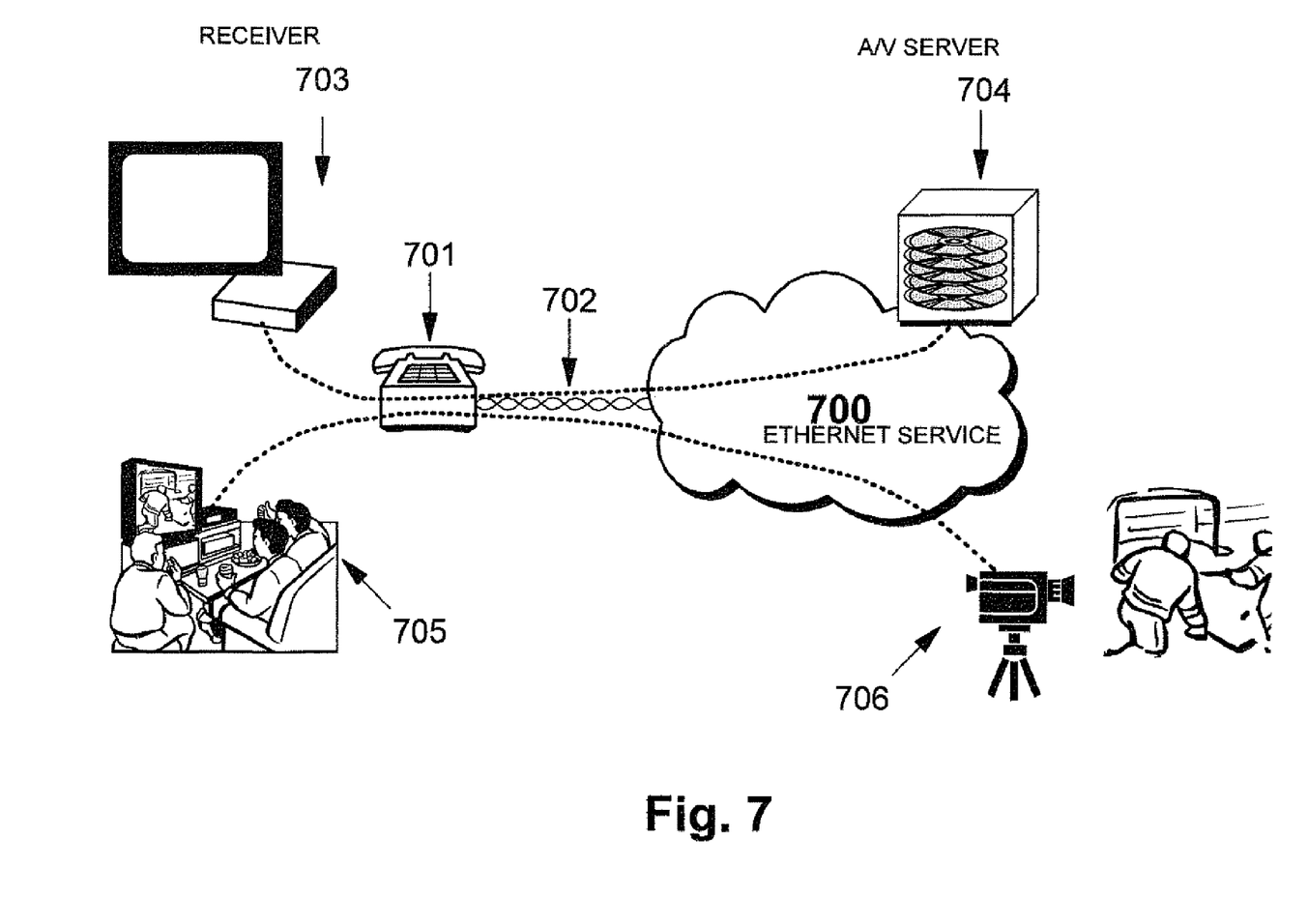
FIG. 7 illustrates in the same way as the previous figure a basic real-time, on-demand video, and audio service, FIG. 8 determines, with the same type of representation of the previous figures, a basic applications and data service, FIG. 9, with the same type of representation of the previous figures, illustrates a possible connection for a large company, and FIG. 10, with the same type of previous representation, shows a possible connection for a small company.

In this example, represented in FIG. 7 showing an alternative for basic real-time and on-order video and audio services by way of the TRUE (701) and the universal Ethernet telecommunications service (700), real time access (705) is gained to video and audio services, which may be, for example, live broadcasts (706) that will be distributed in the network by means of multicast techniques. For the on-demand services, the connections may be made in unicast to the audio and video server's (704), the receiver (703) being provided with a temporary storage element. These services may be offered in the Ethernet domain with the LLC/MAC and TCP/IP protocols and from the IP domain too. For services of this type, the speed of 2 Mbps is very limited and the 10 and 100 Mbps speeds are preferable.

Figure 8:
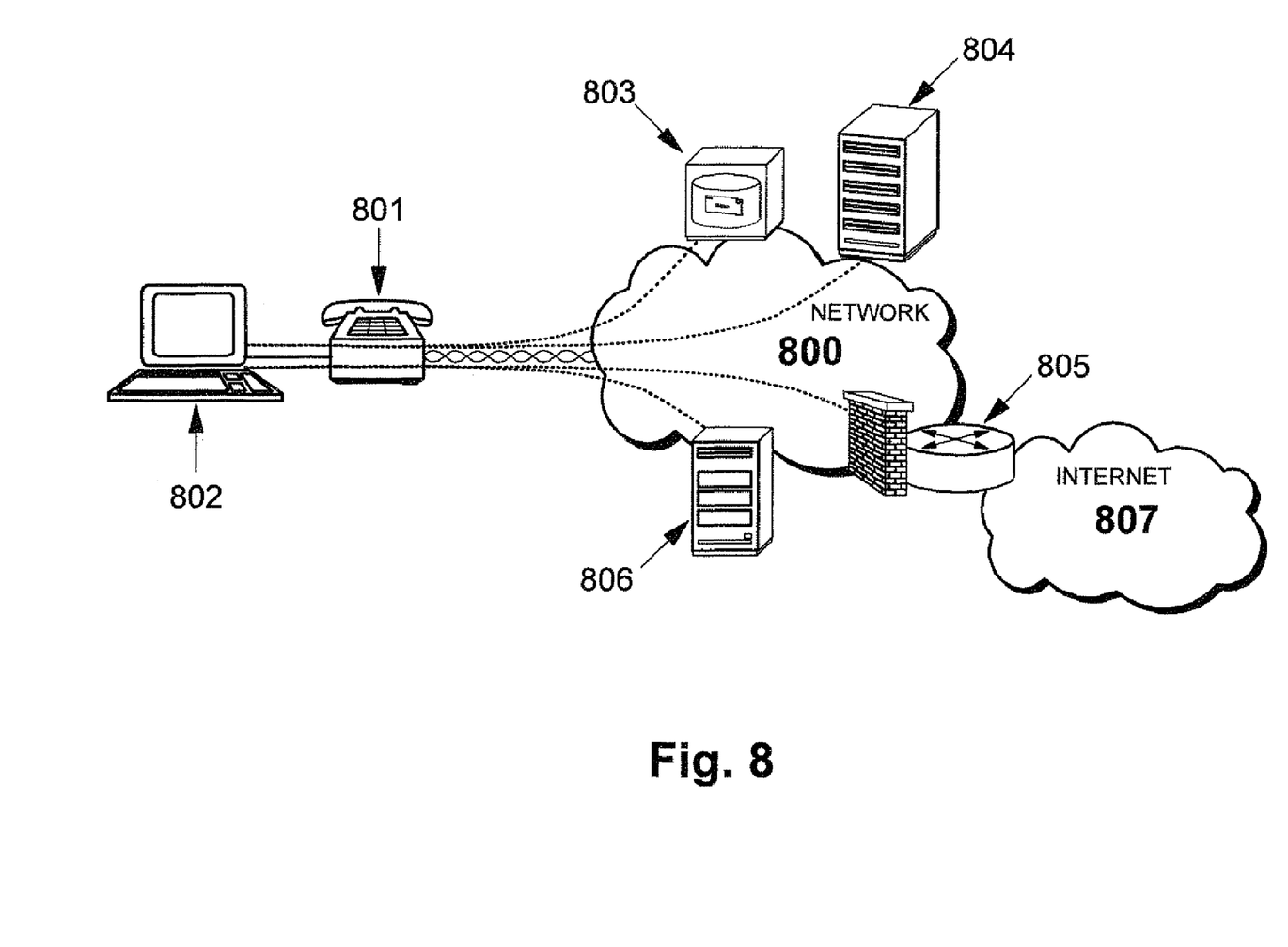

In this case, in FIG. 8 where an example of basic applications and data services is illustrated, the TRUE (801) provides access to the network (800) and the data terminals (802), which may access the mail (803), applications (804) and data (806) servers in the Ethernet domain by means of the LLC/MAC and TCP/IP protocols, and by means of the TCP/IP protocol, via the router with firewall (805), access the Internet (807). In this configuration, the user's terminal will be preferably managed by the service supplier.

Figure 9:
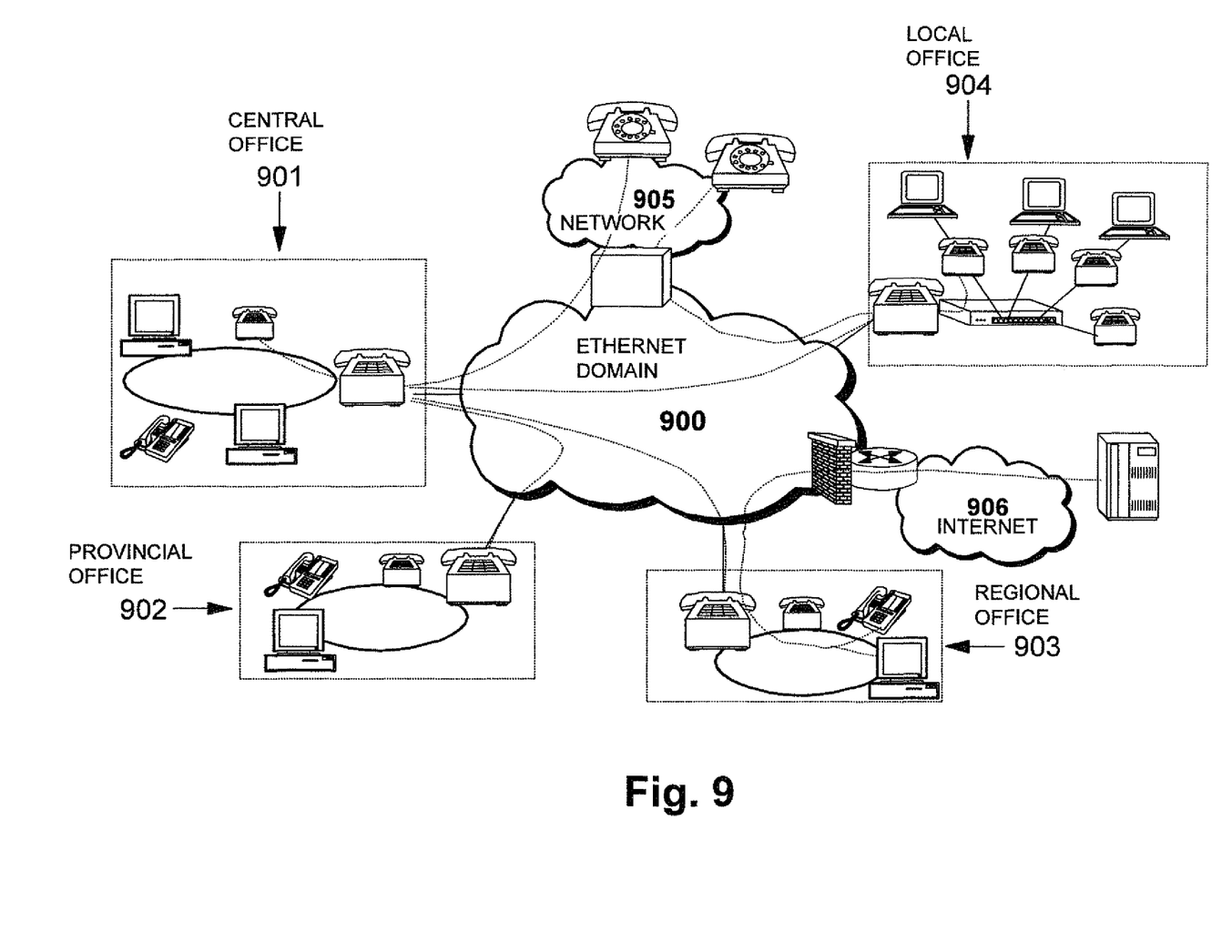

FIG. 9 represents the connection of a large company, with central (901), regional (903) provincial (902) and local (904) offices connected up in an Ethernet domain (900) at speeds in the 2 Mbps to 10 Gbps range, as required, and forming a single network, with the accesses to the telephone network (905) and to the Internet (906) supplied by the operator or respective services supplier.

For the internal connection in each building or premises use may be made of all the physical means described: telephone or data pairs, electrical network cables, optical fibers or wireless systems.

Figure 10:
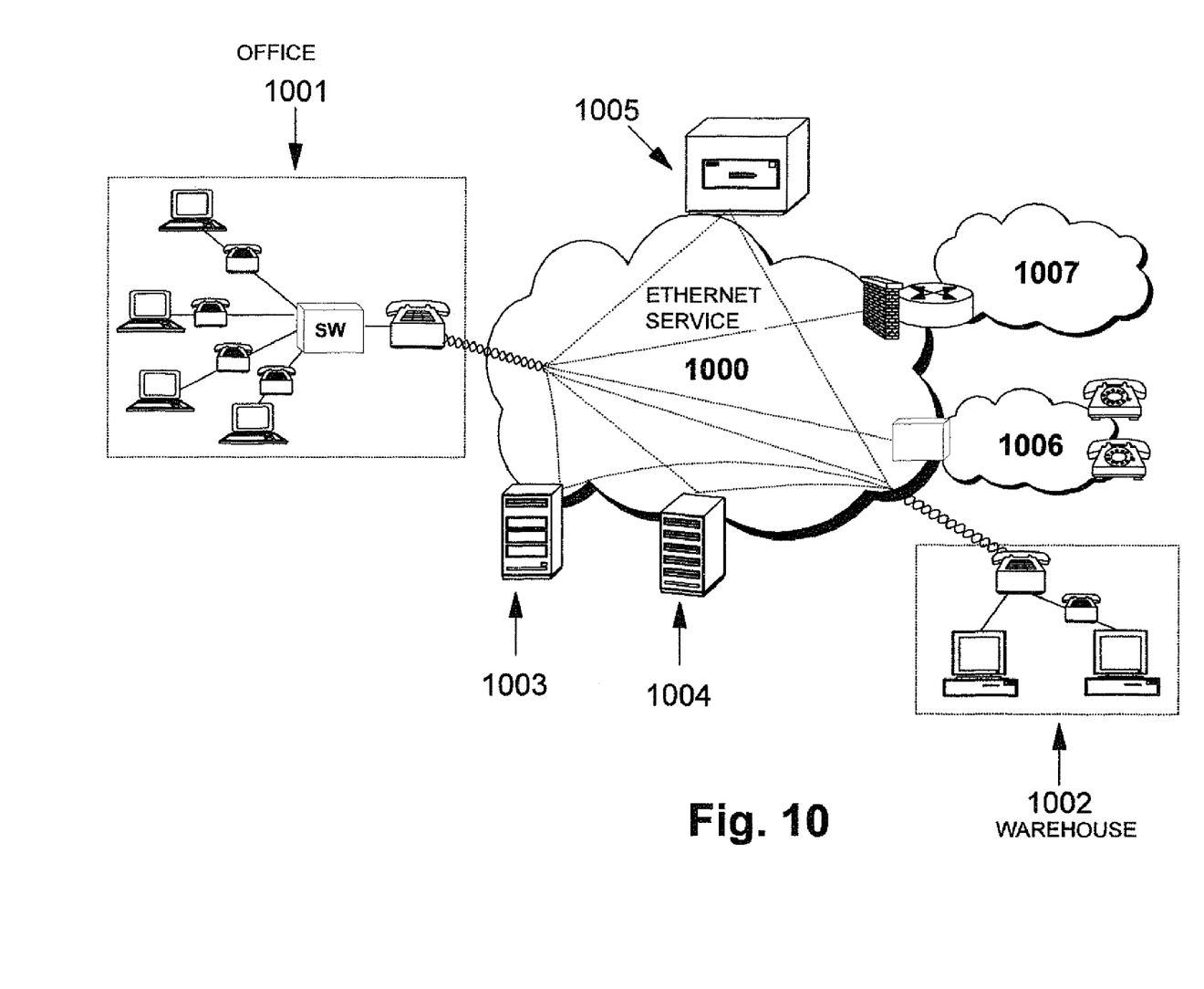

FIG. 10 shows a solution for a company that has two premises connected to the universal Ethernet telecommunications service (1000), with the services externalised. The office (1001) and the warehouse (1002) only have TRUEs, terminals and, for robotised warehouse management, computers. Besides access to the telephone network and to the Internet, the service supplier provides the applications (1004), data with back-up copies (1003), and e-mail (1005) services, as well as those others that might be needed. The physical medium for communication on individual premises may be any of those described in the previous example.

The present invention has been illustrated in addition by means of the following specimen applications, which do not set out to delimit its scope, as the possibilities it offers are practically unlimited.

The basic elements of the TRUE correspond to an Ethernet telephone, but its features, especially in single pair Ethernet mode with the power supply and control over this pair make it radically different from all those currently in existence, and these make it possible, amongst other things, to guarantee the emergency call service, an extremely important feature for telecommunications operators. The basic configuration of this device is described graphically in FIG. 4 for fixed telephony and in FIG. 5 for wireless telephony.

The terminal that is the object of this invention may be a monitor with a processor and memory, to which there are connected a keyboard and a mouse or an equivalent device, a television to which the afore-mentioned functions are added, internally or externally, a complete computer which emulates the terminal by software or any device amenable to being provided with a processor and memory. This type of terminal may be tremendously cost-effective for business networks, in that it reduces the expense per work station, extends the useful life through being a monitor with a keyboard and mouse only, centralises management and reduces security risks, as there is no operating system to be attacked and the supervisor's programs can only be modified by the services supplier. Large companies or organisations may install and manage a network of this type internally with their own resources, externalising the part that proves economic for them, whilst small or medium-sized companies may externalise the whole or part of the service to one or more suppliers. This system may also be used for building super-computers with parallel processors and storage systems connected at Gigabit speeds by means of exchanges for the Ethernet telecommunications service.

The integration of wireless and mobile services based on the packet mode into the network proposed in this invention is immediate. The Ethernet domain is the ideal means for interconnecting the access points that offer connectivity to the wireless terminals based on IEEE 802.11/Wi-Fi, IEEE 802.16/WiMAX, IEEE 802.20 and to GPRS and third generation type mobiles as UMTS. In the cases in which the source encapsulating is already carried out with the IEEE 802.3 frame format, as happens for instance in Wi-Fi, the integration of services is transparent. In cases where this is not so, the possibility could be considered of using this type of encapsulating too, which could be beneficial for mobiles systems in packet mode, as protocol overloading is minimised and efficiency in communications over the wireless medium is enhanced.

The operators and suppliers may offer multiple services by way of the connection set up via the TRUE. These services may be combined with one another to adapt to user demand. Without restricting their possibilities, FIGS. 6, 7 and 8 describe some of the modes of providing the different basic services. The universal service may be used by multiple mode companies and two examples are offered for informative purposes in FIGS. 9 and 10. A large corporations may opt for managing their installation and contracting connectivity services only from the telecommunications operator, or else for outsourcing all or part to one or more services suppliers.

This system may be applied very advantageously for systems of optimisation of the use of electricity. By means of the PLC interface, which enables devices to be connected via electrical cables, with 802.3 encapsulating in the user's network and adding terminal functions to household appliances, these could be controlled from the electrical utility, so that they could be activated and de-activated in accordance with the load situation of the power supply network, so that, for instance, if a peak should occur during the summer, they could cause the air-conditioning systems to raise the setpoint temperature and thereby reduce their consumption, dishwasher and washing machines could be switched on in trough consumption hours, and likewise many other devices, which would have a very favourable impact on the user's bill and on the utilisation of the generating plants and transport network of the electrical utilities.

An optimum application of this invention is the connection to the electrical network of hybrid cars, which have a fuel engine that works at the point of maximum output and generates electricity, electrical traction motors and energy storage batteries, by means of PLC connections via the battery charging management device to the universal Ethernet telecommunications services network access terminator. When the network had surplus power, in consumption troughs or due to renewable energy-systems, such as solar panels or aerogenerators, the surplus energy from the electrical network would be given over to charging the batteries of hybrid vehicles, while at consumption peaks energy could be taken from the batteries, the charge being recovered in the vehicle later with the fuel engine. Taking into account that hybrid cars are much more efficient than fuel engine cars, this system would be tremendously beneficial from the energy and environmental point of view. As an additional idea, hybrid vehicles should have all the surface area possible covered with solar cells to charge the batteries or deliver energy to the electrical network. Bearing in mind the millions of cars in existence, the photovoltaic generating surface would be enormous and would not represent any problem through not taking up additional space.

It is not considered necessary to make the content of this description more extensive for an expert on the matter to be able to appreciate its scope and the advantages stemming from the invention, as well as to develop and implement the object of same.

However, it should be understood that the invention has been described according to a form of preferred embodiment of same and is therefore open to modifications for its adaptation to the different needs, without this representing any alteration of its fundamentals or of its limits of protection.

The invention claimed is:

1. Universal Ethernet Telecommunications Service defines a new Layer-2 Ethernet-Only Communications Architecture, amenable for application to communication relating to voice telephone networks, local area networks, packet telephony, broadband services, data transmission via an electrical network and Internet, that extends an Ethernet local area network to infrastructure of telecom operators and service providers in an "Ethernet domain", comprising:
  a) a Terminator of Universal Ethernet Network (TRUE) (101, 103), for facilitating access to the Layer-2 Ethernet-Only UETS network;
  b) an extension of the Ethernet local area network to the infrastructure of telecom operators and the service providers in the "Ethernet domain", by means of utilization of local MAC addresses, indicated with a U/L bit fixed to one, assigned to every physical interface in order to permit switching by hardware, along the entire path, with no frame modification and no need for routing tables, since the destination address are used as the routing information;
  c) a Terminal Universal Ethernet (TUE), comprising one of a specific device and software designed to run on a computer, and that will use protocols based in IEEE 802.2 LLC for transport in the Ethernet domain, and
  d) an exchange for the universal Ethernet Telecommunications Service (105), wherein for local MAC frames, (bit U/L=1), logical and physical network addresses coincide, not needing additional tables because a destination address carries routing information, designed with levels of quality and reliability required for the telecommunications service, wherein the extension of the Ethernet local network to the infrastructure of the telecom operators and services suppliers in the "Ethernet domain" (100), comprises:
  the distinction and isolation of the Ethernet domain, in which applications use IEEE 802.2 LLC protocols, and an IP domain (111), in which applications use TCP (314), UDP (313) or IP (312) protocols in their versions 4 or 6 (IP and IPv6);
  the delivery of local broadband services to users in the Ethernet domain by means of connections set up with different types of LLC/MAC or TCP/IP protocol, in accordance with features of each class of traffic;
  the identification of the services in the Ethernet domain by means of a combination of the MAC 802.3 addresses and the LLC fields in order to apply congestion control mechanisms based on three priority levels;
  the use of two registers for six-octet MAC addresses, one of them not open to modification containing the universal MAC address, corresponding to a manufacturer of the equipment, and the other optional for the local MAC address configurable by software, which will permit identification of the equipment within the bounds of the Ethernet domain and application of flow control techniques based on prioritising traffic with the local MAC and type 2 LLC in respect of that of universal MAC and LLC in non-connected mode, applying mechanisms similar to those described in IETF RFC2581 for "TCP congestion control", for which it will be necessary to add to the LLC protocol, the selective rejection of frames for performing the function equivalent to rapid retransmission by the TCP double ACK;
  connectivity with other networks to extend basic services, comprising connectively with Internet networks by means of the TCP/IP protocol stack, with MPLS networks for establishment of tunnels that interconnect different Ethernet domains and SDH transmission networks so as to establish digital circuits for carrying Ethernet frames, and
  the possibility that the infrastructure of one operator may support multiple service suppliers by means of VLAN techniques or by locally administered MAC addresses, indicated by the U/L bit fixed to 1, using Banyan, Benes, or Batcher switching matrices, which will route the MAC frames with local addresses, high priority ones, assigned to each physical interface so that the switching may be done by hardware, without need of tables.

2. Universal Ethernet Telecommunications Service according to claim 1, wherein said Terminator of Universal Ethernet Network (TRUE) (101, 103), for facilitating access to the Layer-2 Ethernet-Only UETS network, comprises:
  at least one connection to a universal digital telecommunications service, which uses an Ethernet technique for transmission over telephone pairs (102).

3. Universal Ethernet Telecommunications Service defines a new Layer-2 Ethernet-Only Communications Architecture, amenable for application to communication relating to voice telephone networks, local area networks, packet telephony, broadband services, data transmission via an electrical network and Internet, that extends an Ethernet local area network to infrastructure of telecom operators and service providers in an "Ethernet domain", comprising:
  a) a Terminator of Universal Ethernet Network (TRUE) (101, 103), for facilitating access to the Layer-2 Ethernet-Only UETS network;
  b) an extension of the Ethernet local area network to the infrastructure of telecom operators and the service providers in the "Ethernet domain", by means of utilization of local MAC addresses, indicated with a U/L bit fixed to one, assigned to every physical interface in order to permit switching by hardware, along the entire path, with no frame modification and no need for routing tables, since the destination address are used as the routing information;
  c) a Terminal Universal Ethernet (TUE), comprising one of a specific device and software designed to run on a computer, and that will use protocols based in IEEE 802.2 LLC for transport in the Ethernet domain, and
  d) an exchange for the universal Ethernet Telecommunications Service (105), wherein for local MAC frames, (bit U/L=1), logical and physical network addresses coincide, not needing additional tables because a destination address carries routing information, designed with levels of quality and reliability required for the telecommunications service, wherein the Universal Ethernet Terminal (101, 103) comprises:
  an Ethernet network interface over telephone pair (208), data pairs, optical fiber (207), wireless system (209) or to the electrical network (204), wherein in case of connection over the telephone pair the same techniques will be used as for the universal Ethernet network terminator (101, 103), in the case of data pairs the Ethernet network interface will be used for a 802.3af standard power supply and a power control mechanism will be added for energy saving;

a standard browser used for the Internet, in accordance with the specifications, guidelines, software, and tools defined by the World Wide Web Consortium (W3C) and all applications that are normally used in this environment;

a file handler that is capable of collecting and delivering information needed for operation of the applications (301) that run in the terminal on the browser interface and which is in the Ethernet or IP domains, wherein LLC types 1 (309), 2 (310) and 3 (311) protocols for the Ethernet domain and TCP (314), UDP (313) and IP (312) protocols in the IP domain will be used as main transport mechanisms;

a device for user identification with authentication and certification capabilities, based on a SIM/USIM type card of those used in mobile telephony services, in a key with connection to USB or in an equivalent device;

capability for supplying power over the pairs (102), both in the case of telephone and data pairs, and terminals intended only for generating traffic when they are being used or when essential for the management, operation or maintenance procedures.

4. Universal Ethernet Telecommunications Service defines a new Layer-2 Ethernet-Only Communications Architecture, amenable for application to communication relating to voice telephone networks, local area networks, packet telephony, broadband services, data transmission via an electrical network and Internet, that extends an Ethernet local area network to infrastructure of telecom operators and service providers in an "Ethernet domain", comprising:

a) a Terminator of Universal Ethernet Network (TRUE) (101, 103), for facilitating access to the Layer-2 Ethernet-Only UETS network:

b) an extension of the Ethernet local area network to the infrastructure of telecom operators and the service providers in the "Ethernet domain", by means of utilization of local MAC addresses, indicated with a U/L bit fixed to one, assigned to every physical interface in order to permit switching by hardware, along the entire path, with no frame modification and no need for routing tables, since the destination address are used as the routing information;

c) a Terminal Universal Ethernet (TUE), comprising one of a specific device and software designed to run on a computer, and that will use protocols based in IEEE 802.2 LLC for transport in the Ethernet domain, and d) an exchange for the universal Ethernet Telecommunications Service (105), wherein for local MAC frames, (bit U/L=1), logical and physical network addresses coincide, not needing additional tables because a destination address carries routing information, designed with levels of quality and reliability required for the telecommunications service, wherein the universal Ethernet telecommunications service exchange (105) comprises:

capabilities for switching and routing at link layer by combination of the Ethernet MAC address and the LLC fields, in which priorities will be applied in the following order: high priority for local addressing MAC traffic, medium priority for LLC Type 2 traffic and minimum priority for the rest;

at least one Ethernet frame switches, for most powerful machines, based on Banyan, Benes, Batcher switching matrices, which will route the MAC frames with local addresses, high priority ones, assigned to each physical interface so that the switching may be done by hardware with a mechanism analogous to that used in ATM, and another mandatory one, in accordance with IEEE 802.1 specifications, which will take care of the MAC frames with universal addresses and the local ones if there is no matrix switch;

an input selector for handling priorities and congestion control, which routes the local MAC frames to the matrix switch and the universal MAC frames to the conventional Ethernet switch, and which should be capable of returning LLC Type 2 protocol flow control frames if thresholds are exceeded that are defined in each case for the execution of control of congestion towards the terminal;

handling of VLANs, multicast support at the MAC and IP levels, service quality and security with the detection system and intrusion blocking at the MAC level, which prevents users from being able to make layer 2 attacks in the Ethernet domain (100);

power supply over the pairs (102) at the connections by copper cables, power control at interface level and at complete system level, and battery;

connections by means of telephone pair (208), data pairs (207), electrical network cables (204), optical fibers (207) or wireless systems (209), and the interface needed for IP networks IP (111) and the Internet, with firewall and intrusion detection system at IP level (IDS) and translation of addresses (NAT) and optional interfaces to MPLS (112) and SDH (113) networks.

\* \* \* \* \*